United States Patent
Wassew et al.

(10) Patent No.: US 7,324,543 B2
(45) Date of Patent: Jan. 29, 2008

(54) METHOD FOR PROTECTING AGAINST OVERLOAD IN A MOBILE COMMUNICATION NETWORK

(75) Inventors: Alexander Wassew, Buxtehude (DE); Maik Bollmann, Vlotho (DE); Markus Cech, Laatzen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 667 days.

(21) Appl. No.: 10/476,744

(22) PCT Filed: May 14, 2002

(86) PCT No.: PCT/EP02/05305

§ 371 (c)(1),
(2), (4) Date: May 19, 2004

(87) PCT Pub. No.: WO02/093958

PCT Pub. Date: Nov. 21, 2002

(65) Prior Publication Data

US 2004/0208126 A1 Oct. 21, 2004

(30) Foreign Application Priority Data

May 14, 2001 (EP) ................................. 01111656
May 14, 2001 (EP) ................................. 01111663

(51) Int. Cl.
*H04Q 7/00* (2006.01)
(52) U.S. Cl. ...................... 370/437; 455/453
(58) Field of Classification Search ............ 370/307, 370/278, 329, 431, 437; 725/105; 709/205; 455/450, 453
See application file for complete search history.

(56) References Cited

U.S. PATENT DOCUMENTS

| 5,666,356 | A | * | 9/1997 | Fleming et al. | ............. | 370/328 |
| 5,742,588 | A |   | 4/1998 | Thornberg et al. | | |
| 5,878,026 | A | * | 3/1999 | Greenberg et al. | .......... | 370/230 |
| 5,881,060 | A | * | 3/1999 | Morrow et al. | ............. | 370/337 |
| 6,088,335 | A | * | 7/2000 | I et al. | ........................ | 370/252 |
| 6,134,220 | A | * | 10/2000 | Le Strat et al. | ............. | 370/252 |
| 6,490,271 | B1 | * | 12/2002 | Erjanne | ..................... | 370/347 |
| 6,650,643 | B1 | * | 11/2003 | Dobson | ................... | 370/395.1 |
| 6,662,367 | B2 | * | 12/2003 | Dapper et al. | ............. | 725/105 |
| 6,970,422 | B1 | * | 11/2005 | Ho et al. | ..................... | 370/230 |
| 7,123,592 | B2 | * | 10/2006 | Geile et al. | ................. | 370/307 |
| 7,173,904 | B1 | * | 2/2007 | Kim | ........................... | 370/230 |

* cited by examiner

*Primary Examiner*—John Pezzlo

(57) ABSTRACT

Method for protecting against overload of a multipoint-to-point channel of a mobile communication network, said multipoint-to-point channel being provided by a radio access network for the mobile communication network in order to enable a plurality of mobile communication means to access the mobile communication network, wherein each mobile communication means can attach to the multipoint-to-point channel to provide processing requests of at least two different request types through the multipoint-to-point channel to the mobile communication network, in particular to a packet switching node of the mobile communication network, comprising the steps of: —receiving a processing request; —detecting the request type of the received request; —counting the number of mobile communication means presently attached to the multipoint-to point channel; —determining, based on the counted number of attached mobile communication means, a present load on the multipoint-to-point channel; and deciding whether to reject or to accept the request for processing, wherein the decision is based on the detected request type and on the determined present load of the multipoint-to-point channel.

21 Claims, 5 Drawing Sheets

| Rule | Measure |
|------|---------|
| RA | MA and MC |
| RB | MB and MD |
| RC | MA and MC |
| RD | MA |
| RE | MC |

METHOD FOR PROTECTING AGAINST OVERLOAD IN A MOBILE COMMUNICATION NETWORK

BACKGROUND OF THE INVENTION

The invention addresses the field of mobile communications. The invention relates to a method for protecting against overload of a multipoint-to-point channel of a mobile communication network, the multipoint-to-point channel being provided by a radio access network for the mobile communication network in order to enable a plurality of mobile communication means to access the mobile communication network, wherein each mobile communication means can attach to the multipoint-to-point channel to provide processing requests of at least two different request types through the multipoint-to-point channel to the mobile communication network, in particular to a packet switching node of the mobile communication network. The invention further relates to a network node element of a communication network, a communication network, a computer program, and a machine-readable medium.

A system for mobile communications is known that comprises a first cellular network according to the Japanese "Personal Digital Cellular" (PDC) standard, also called "Pacific Digital Cellular" standard, that is based on the known RCR-STD 27 standard, version H, of the Association of Radio Industries and Businesses (ARIB), and a second cellular network according to the "Packet Personal Digital Cellular" (PPDC) standard, also called "Packet Pacific Digital Cellular" standard.

The Packet Personal Digital Cellular network comprises a packet mobile services switching center (PMSC) that realizes a switching of packet data exchanged between a mobile station of a subscriber and, for example, an application server holding packet data content for the subscriber.

The Packet Personal Digital Cellular network comprises a radio access network with a base station in each cell of the cellular network, wherein the base stations include a transceiver and an antenna for communication over the air with the mobile station located in the cell. The cellular network provides a packet communication physical channel (PPCH) between the mobile station and the base station. This physical channel is a particular dedicated Radio Frequency Time Slot (RFTS) within a Time Division Multiple Access (TDMA) frame structure on a carrier frequency. Radio signals transmitted from and received by the base station are used by the mobile station to communicate with the network via the packet communication physical channel. The base station provides the packet data received in the radio signals from the mobile station to the packet mobile services switching center. A user packet channel (UPCH) is used as a logical channel between the mobile station and the packet mobile services switching center in order to transmit the packet data from the mobile station to the packet mobile services switching center. The logical channel used for carrying user packet data, i.e., the user packet channel, is defined as a particular Radio Frequency Time Slot (RFTS) of the packet communication physical channel (PPCH).

The user packet channel is a point-to-multipoint bi-directional channel, for example, used in cellular 2G+ (Second Generation Plus) networks to transfer user packet data and the corresponding control signals between the base station and the connected mobile stations. The bandwidth of the user packet channel is shared between all mobile stations which are currently connected to the channel. Data traffic in downlink (also called: downstream) direction, i.e. from the network to the mobile station, is controlled by the base station. The base station determines when to send which data packet. Thus, access control to the channel is concentrated in one single instance, such that on the channel, in downlink direction, no two packets are sent out at the same time.

Compared with the well-regulated data traffic on the user packet channel in the downlink direction, in the uplink (also called: upstream) direction, i.e. in the direction from the mobile station to the network, in particular to the packet mobile services switching center, a plurality of independent mobile stations located in the cell of the base station randomly compete for access to the same resource, that is the same channel is shared by the mobile stations. The competition is thus organized in a random access mode. As a result, the throughput of data packets through the user packet channel depends on the number of data packets which are offered for transfer over the channel.

The relation between offered data packets and throughput of data packets is shown in FIG. 1. As the number of offered data packets is raised, the throughput of data packets first rises up to a number of data packets t(opt) where approximately twenty percent of the theoretical capacity of the user packet channel is used for throughput of data packets. However, as the number of offered data packets is further raised, instead of a further increase in throughput of data packets, despite the unused theoretical capacity of the channel, the throughput of data packets decreases below t(opt). Thus, throughput through the user packet channel reaches an early optimum at an optimum number o(opt) of offered data packets before degrading. To the left of the optimum number o(opt), the throughput of data packets cannot be raised because there is nothing more to transfer. However, to the right of the optimum number o(opt) of offered data packets, there is too much transfer of data packets resulting in a growing number of packet collisions. Packets being sent out simultaneously from different mobile stations interfere in the air and destroy each other such that a retransmission is required. The retransmission of those data packets costs bandwidth. Of course, the retransmission can fail such that a further retransmission is required.

As a result, once the offered data packet traffic exceeds the limit of the optimum number o(opt) of offered data packets, uplink packet data traffic from the mobile stations visiting a cell to the packet mobile services switching center that controls this cell provides an unstable system: retransmissions of some offered data packets will be necessary that add to the offered traffic such that even more retransmissions are required adding further to the offered traffic—until the system collapses, i.e. until the channel is congested.

A call admission control (CAC) system has been proposed to protect the user packet channel against overload such that the optimum number o(opt) of offered data packets is not exceeded. Thus the channel should be kept usable for the users registered to the packet mobile services switching center. The known call admission control system uses complex algorithms to prevent the overload situation. Approaches were proposed to model a network behavior based on queuing of handover requests and queuing of new call arrivals sent by a mobile station. Requirements of the call admission control mechanism are summarized for the mechanism to be implemented in the base station. However, the known call admission control system is disadvantageous for the following reasons: regarding processing time and memory, queuing of new call arrivals and queuing of handover requests are cost intensive operations and, regarding timing, they lead to a delay of a response to the requesting mobile station. Moreover, the base station only obtains fragments of the information related to new call arrivals and handover requests and therefore does not know about new call arrivals or handover requests outside its coverage area.

The problem underlying the invention is to enable a protection against overload that is efficient and simple to run while requiring few system resources such that the system quality of service to users is improved.

SUMMARY OF THE INVENTION

According to a first aspect of the invention, a method for protecting against overload of a multipoint-to-point channel of a mobile communication network is provided, the multipoint-to-point channel being provided by a radio access network for the mobile communication network in order to enable a plurality of mobile communication means to access the mobile communication network, wherein each mobile communication means can attach to the multipoint-to-point channel to provide processing requests of at least two different request types through the multipoint-to-point channel to the mobile communication network, in particular to a packet switching node of the mobile communication network, comprising the steps of:

receiving a processing request;
detecting the request type of the received request;
counting the number of mobile communication means presently attached to the multipoint-to-point channel;
determining, based on the counted number of attached mobile communication means, a present load on the multipoint-to-point channel; and
deciding whether to reject or to accept the request for processing, wherein the decision is based on the detected request type and on the determined present load of the multipoint-to-point channel.

The mobile communication means being attached to the multipoint-to-point channel may be in any state but total switch off, i.e., the mobile communication means may be in a state where the mobile communication means actively transmits or receives packet data, the mobile communication means may be in a state where the mobile communication means has established a packet data session but is presently idle, i.e., does presently not actively transmit or receive data, and the mobile communication means may be in a state where it is just online while presently not having established any packet data session. The attachment may be reflected in a registration of the mobile communication means with a node of the network.

Determining the present load comprises the step of checking the present load against a predetermined load level. The step of deciding whether to reject or accept the request for processing, for example, based on a check against the current value of the counter provided for the multipoint-to-point channel, constitutes an extension to the known processing of the request. The extended processing of requests comprises the steps of the method according to the invention plus the known steps of the request processing.

The inventive method enables a high data packet throughput through the multipoint-to-point channel because the multipoint-to-point channel is prevented from running into an overload state where throughput would be far less than optimal. Implementation of the inventive method is particularly simple as it is based on counting the number of mobile communication means presently attached to the multipoint-to-point channel. For the simplicity of the inventive method, application of the method requires only few resources for processing, i.e., processing power and memory are saved. Higher quality of service can be provided because load on system resources is reduced when compared with the known call admission control system.

Preferably, the load is determined directly proportionally to the counted number of attached mobile communication means. In this embodiment, in order to decide whether to reject or to accept the request for processing, the counted number can simply be compared with the predetermined value.

Preferably, the method further comprises the step of, according to the decision regarding rejection or acceptance of the request for processing, either rejecting or accepting the request for processing. Thus, an efficient protection against overload is obtained.

In one embodiment, the request for processing is rejected if the detected request type is equal to a predetermined request type and the determined channel load exceeds a predetermined channel load limit that applies to the predetermined request type. Implementation of this rejection scheme is particularly easy as the cumulative conditions for the rejection of the processing request can checked by two simple comparisons, one concerning load values and the other concerning type values.

In one embodiment, at least two different channel load limits are provided that apply to at least two different predetermined request types. The overload state on the multipoint-to-point channel is thus defined by a multistaged limit, i.e., requests of different request types, at one overload state, may both be rejected, however, at a less severe overload state, requests of a first type may be rejected while requests of a second type that enjoys priority over the first type may be accepted for processing.

In one embodiment, the first channel load limit applies to a first communication request type that is used for initial requests for communication service. The mobile communication means sends an initial request, for example, if the mobile communication means attempts to establish a session with the packet switching node of the mobile communication network. The mobile communication means may send the initial request also in the case where one session is established, in order to attempt establishment of an additional second session. The first session and the second session may be established for communication services of different providers and the sessions may be of different quality, for example, the first session being established as a real time session for video streaming while the second session is established as a best effort session for providing e-mail service to the mobile communication means. In one embodiment, the initial request may be rejected or accepted for further processing, wherein the decision depends on the type of the requested communication service. Preferably, the multistage limit is applied in order to differentiate between the communication service types and thus, for example, take into account the volume of the data traffic expected to be involved with the requested communication service.

In one embodiment, the second channel load limit applies to a second communication request type used for requests for communication service further to a successful initial request for communication service. Preferably, the second channel load limit is superior to the first channel load limit. Thus, while initial requests for communication service are rejected, requests sent, for example, during an ongoing session of the mobile communication means may be processed such that the quality of service is particularly good once the session is established.

In one embodiment, a third channel load limit applies to a handover request type. The handover request type comprises requests where the channel is reselected. Channel reselection occurs, for example, when the mobile communication means moves during packet data communication session and switches to the multipoint-to-point channel of another cell controlled by the same packet switching node. Preferably, the third channel load limit is superior to any other load limit. Thus, handover requests are prioritized with respect to other requests such as new call arrivals, i.e. initial communication service requests. The prioritization ensures that a particularly high quality of service is provided to users that are on the move through the mobile communication network.

In one embodiment, the multipoint-to-point channel is provided as a packet communication physical channel (PPCH). In one embodiment, the multipoint-to-point channel is provided as a user packet channel (UPCH).

In one embodiment, the mobile communication network comprises a packet switching node that is provided with resources for processing of processing requests, particularly processing requests received via the multipoint-to-point channel, and with an overload protection task for protection of the resources from overload, the resources comprising at least one input queue for processing requests, a processor for request processing and a memory for storing data related to request processing, the resources for processing being limited, wherein said network node, in particular said overload protection task, performs the steps of:

monitoring a load status of said node resources,
detecting, by means of the load status, any overload situation arising at the monitored node resources, and
determining, in the case of a detected node resource overload situation, dependent on predetermined rules, an overload dissolving measure.

The processor is, e.g., provided as a central processing unit. The memory is, e.g., provided as a random access memory unit. Data related to request processing may be data that need to be stored temporarily during processing. The load status of the resources of the network node relates to any load, for example a registration request or a deregistration request, whose handling on input to the node involves one or more node resources. For example, control signaling may require processing of a control signal; this processing is conducted by the central processing unit of the node. Thus, a node resource is used. For another example, processing of user data requests may require temporary storage; this storage is conducted in the memory unit of the node. Thereby, another node resource is used. The input queue is filled with processing requests and thus comprises load that is due for handling by the node. The input queue may be provided, for example, as a list comprising entries of control signaling requests and/or user data requests that await processing and/or storing. Monitoring the load status of the resources comprises monitoring the fill level of the input queue. For a given network node comprising a given hardware, the network node's capacity to process said control signaling requests and/or user data requests is limited.

This embodiment of the inventive method is particularly advantageous because the system availability to registered users and quality of service (QoS) is maximized as both the multipoint-to-point channel from the mobile station to the network is kept from congesting and the packet switching network node is kept stable and reliable though it may run at its limits.

According to a preferred embodiment of the invention, the overload protection task of the packet switching node is run cyclically. It has a very high priority such that it is prioritized over at least most other tasks. In every cycle, the overload protection task monitors the load status of the node resources and thus checks whether an overload situation occurs. The overload protection task detects the occurrence of a critical load situation if, regarding the load status of the monitored node resource, a defined rule is violated. Preferably, the rule is defined prior to running the overload protection task, e.g., already at system start up. In one embodiment, the overload protection task is helped by at least one supervision task that enjoys a high priority. The supervision task may be provided as a subroutine comprised within the overload protection task. In one embodiment, overload task and supervision task enjoy equally high priority. In one embodiment, the overload task and/or the supervision task are provided as overload RTOS-tasks, where RTOS stands for Real Time Operating System.

In one embodiment, the node resources comprise at least a second input queue for processing request, the first input queue being dedicated to receiving control signaling requests such as registration/deregistration requests and the second input queue being dedicated to receiving user data requests, the user data requests being provided as user data packets, in particular user data Internet protocol packets. This embodiment allows to separately monitor the node load status with respect to incoming control signaling requests and with respect to incoming user data requests.

In one embodiment, the step of detecting a node resource overload situation comprises detecting whether memory consumption exceeds a predetermined first threshold (hereafter also referred to as rule RA). Thus, a node overload dissolving measure can be determined in case of memory shortage. In one embodiment, the step of detecting a node resource overload situation comprises detecting whether memory consumption exceeds a predetermined second threshold (hereafter also referred to as rule RB), the second threshold being superior to the first threshold. This embodiment enables to determine a second overload dissolving measure that, e.g., may be more effective than the first overload dissolving measure, in case of the memory shortage having grown worse.

In one embodiment, the step of detecting an overload situation comprises detecting whether the processor load exceeds a predetermined processor load limit (hereafter also referred to as rule RC). This embodiment allows to determine an overload dissolving measure that is specifically adapted to deal with processor overload. In one embodiment, the overload situation is detected if the processor load exceeds a certain limit for a certain interval of time, measured, e.g., by counting ticks of a processor clock for several ticks.

In one embodiment, the step of detecting an overload situation comprises detecting whether the fill level of the input queue exceeds a predetermined fill level. Preferably, the step of detecting an overload situation comprises detecting whether the fill level of control signaling requests in the first input queue exceeds a predetermined control signaling request fill level (hereafter also referred to as rule RD). This embodiment allows to determine an overload dissolving measure that is specifically adapted to deal with overload due to control signaling requests. Particularly preferably, the step of detecting the overload situation comprises detecting whether the fill level of user data requests in the second input queue exceeds a predetermined user data request fill level (hereafter also referred to as rule RE). This embodiment allows to determine an overload dissolving measure that is specifically adapted to deal with overload due to user data requests. Thus, depending on the cause of the detected overload situation (control signaling requests or user data requests), a suitable measure to dissolve the detected overload can be determined.

In one embodiment, if the memory consumption exceeds the predetermined first threshold (Rule RA), the determined overload dissolving measure comprises rejecting a predetermined ratio of control signaling requests received in the first input queue (hereafter also referred to as measure MA) and dropping the user data requests, i.e., the internet protocol packets from the second input queue (hereafter also referred to as measure MC). Thereby, the number of new registration requests that are processed is restricted in accordance with the predetermined ratio of user requests. For example, measure MA may be defined to drop twenty percent of the new requests received in the first input queue; thus, when executed, on average, every fifth new request is dropped, i.e., only four out of five requests are queued for processing, and thus the overload is dissolved.

In one embodiment, if the memory consumption exceeds the predetermined second threshold (RB), the determined overload dissolving measure comprises rejecting all control signaling requests received in said first input queue (hereafter referred to as measure MB) and dropping all user data requests, i.e., all internet protocol packets from the second input queue (hereafter referred to as measure MD). Thus, one hundred percent of the new requests are dropped. In one embodiment, the input queue is flushed, i.e., all queued request are removed from the queue. Preferably, at least the second input queue is flushed such that all queued user data requests are removed from this queue. Flushing the second input queue results in a particularly effective relief from node overload.

In one embodiment, if the processor load exceeds the predetermined processor load limit (RC), the determined overload dissolving measure comprises rejecting the predetermined ratio of control signaling requests received in the first input queue (MA) and dropping the user data requests, i.e., the Internet protocol packets from the second input queue (MC). In one embodiment, the measures MA and MC are determined only if the processor load exceeds the predetermined processor load limit for a certain interval of time, measured, e.g., by counting ticks of the processor clock for several ticks.

In one embodiment, if the fill level of control signaling requests in the first input queue exceeds the predetermined control signaling request fill level (rule RD), the determined overload dissolving measure comprises rejecting a predetermined ratio of control signaling requests received in the first input queue (measure MA).

In one embodiment, if the fill level of user data requests in the second input queue exceeds the predetermined user data request fill level (rule RE), said determined overload dissolving measure comprises dropping of user data requests, i.e., internet protocol packets from said second input queue (measure MC). Preferably, the determined measure requires the second input queue to be flushed.

Preferably, the inventive overload protection method comprises the step of dissolving the detected overload situation by execution of the determined at least one overload dissolving measure. In one embodiment, execution of the determined overload dissolving measure is suspended if the determined overload situation is dissolved.

According to a second aspect of the invention, a network node element of a communication network is provided, in particular a network node element comprising a mobility management instance for providing functions to the network node element that support mobility of mobile communication means in the communication network, the network node element being adapted to perform a method according to the inventive method. Preferably, the functionality for the multipoint-to-point overload protection resides in the packet switching node comprising the network node element such that no changes to or modifications of other network elements are needed. As the overload protection functionality is concentrated in one network element, an upgrade of control software in order to provide or to improve the overload protection functionality is particularly simple.

The network node element comprises a counter reflecting the number of current users, i.e., subscribers or mobile communication means currently attached to the multipoint-to-point channel; in one embodiment, there is one instance of the counter per multipoint-to-point channel.

Preferably, the network node element is provided with node resources for processing of processing requests received through the multipoint-to-point channel and with an overload protection task for protection of the node resources from overload, the resources comprising at least one input queue for requests to be processed, a processor for request processing and a memory for storing data related to request processing, wherein the network node's capacity for processing is limited. Preferably, the network node element is adapted to perform the inventive method for protecting against overload of the packet switching network node (PMSC). Thus, particularly the packet switching network node that the network node element belongs to can be protected. However, the network node element may also be provided for a mobile switching center (MSC) in general, a base station (BS), a base station controller (BSC), a radio network controller (RNC), a serving GPRS (General Packet Radio Service) support node (SGSN) etc.

According to the invention, a network node of a communication network is provided that comprises at least one network node element according to the invention.

According to a third aspect of the invention, a communication network is provided that comprises at least one inventive network node element.

According to a fourth aspect of the invention, a computer program is provided that is loadable into an internal memory of a digital processing unit and comprises software code portions adapted to control the steps according to the inventive method, when the computer program is executed on the digital processing unit. Thus the invention is realized by software. Preferably, the computer program is stored on a machine-readable medium, in particular a computer-readable medium. The medium may, e.g., be a compact disc read only memory (CD ROM), a floppy disc, an optical disc, or a hard disc. Thus good physical portability of the software is provided. Upgrades of the software can easily be performed.

According to the invention, a machine-readable medium is provided that comprises the inventive computer program.

Embodiments of the invention can be used in any communication system as defined by the Third Generation Partnership Project (3GPP) in the release of 1999 as well as in all future releases thereof, in Universal Mobile Telecommunications System (UMTS) networks, in Personal Digital Cellular (PDC) and/or Packet Personal Digital Cellular (PPDC) networks, Global Standard for Mobiles (GSM) networks, core networks, wireless local area networks (WLAN), and the corresponding network provider and/or user equipment.

BRIEF DESCRIPTION OF THE DRAWINGS

These and other aspects of the invention will be more fully understood by referring to the following detailed description of an embodiment of the invention and the accompanying drawings wherein.

DETAILED DESCRIPTION OF THE DRAWINGS

Figure 1:
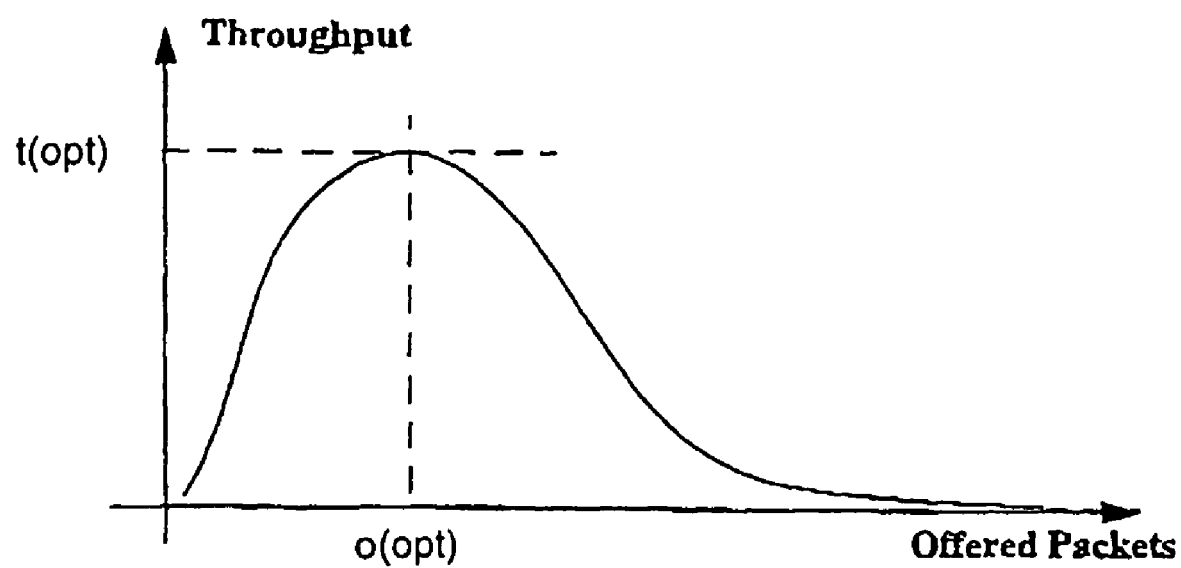
FIG. 1 shows a relation between offered data packets and throughput of data packets in the case of a known user packet channel.

FIG. 1 illustrates a fundamental problem of multipoint-to-point channels for packet data communication. FIG. 1 shows the relation between offered data packets and throughput of data packets through user packet channel, i.e., a multipoint-to-point channel. As a number of offered data packets is raised above an optimum number o(opt), the throughput of data packets decreases. Thus, throughput through the user packet channel reaches an early optimum t(opt) before degrading. To the left of the optimum number o(opt) of offered data packets, the throughput of data packets cannot be raised because there is nothing more to transfer. However, to the right of the optimum number o(opt) of offered data packets, there is too much transfer of data packets resulting in a growing number of packet collisions. Packets being sent out simultaneously from different mobile stations interfere in the air and destroy each other such that a retransmission is required. The retransmission of those data packets costs bandwidth. In addition, the retransmission can fail such that a further retransmission is required. As a result, once the offered data packet traffic exceeds the limit of the optimum number o(opt) of offered data packets, uplink data packet traffic from mobile stations visiting a cell to the packet mobile services switching center that controls this cell provides an unstable system: retransmissions of some offered data packets will be necessary that add to the offered traffic such that even more retransmissions are required adding further to the offered traffic until the channel is congested.

Figure 2:
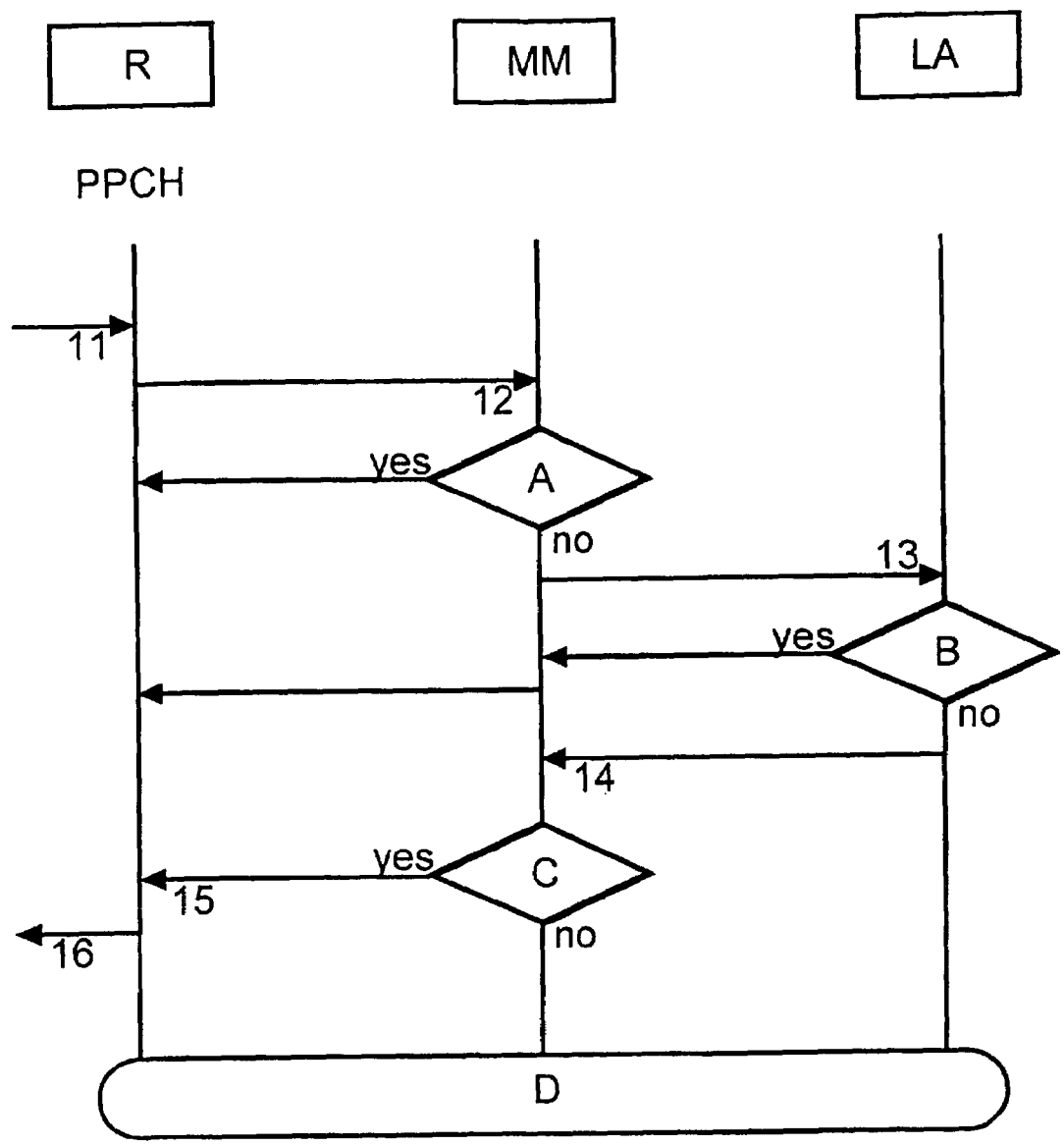
FIG. 2 shows a signaling sequence of an embodiment of the invention applied in the case of a first communication request.
Figure 3:
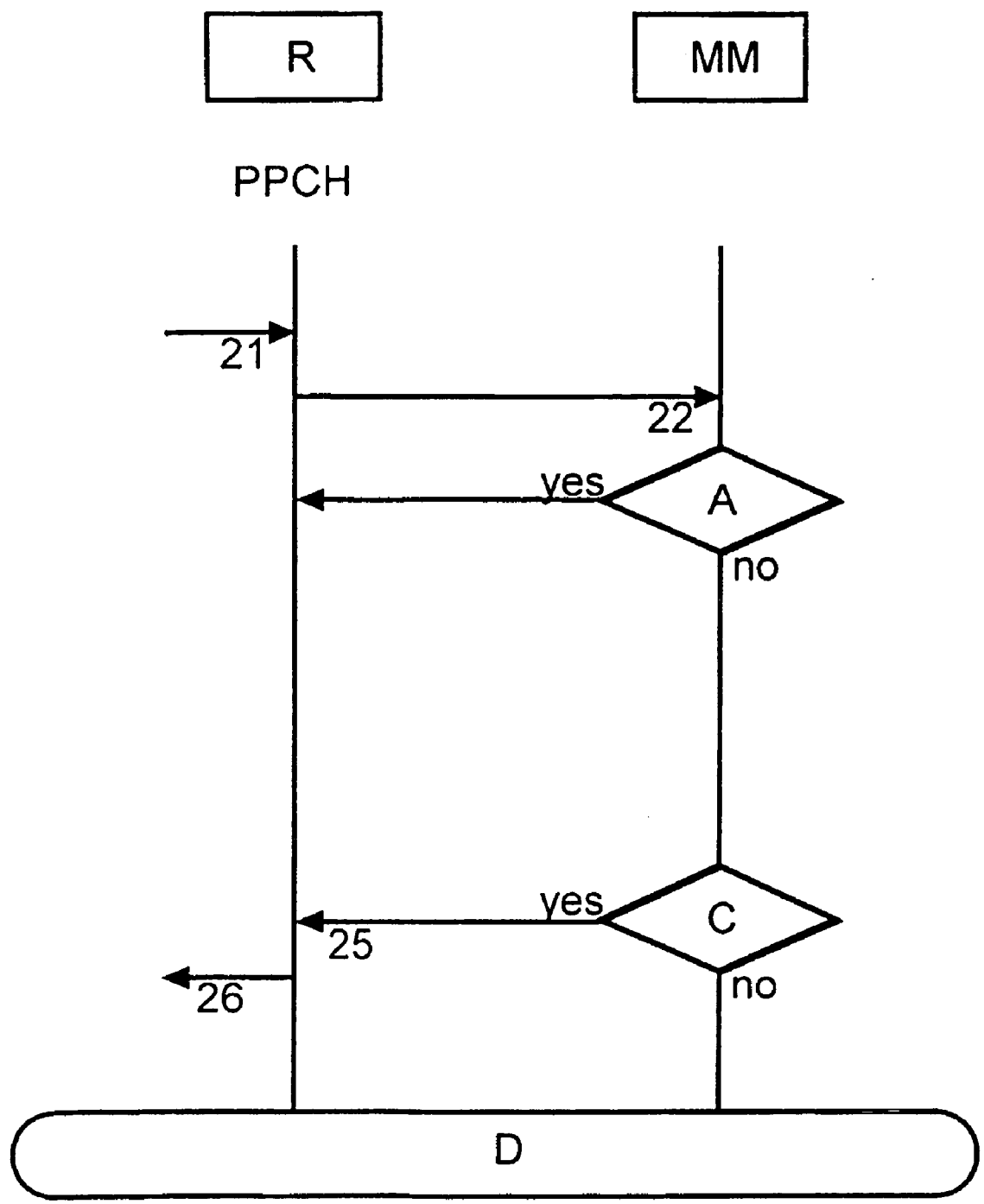
FIG. 3 shows a signaling sequence of an embodiment of the invention applied in the case of a second communication request.
Figure 4:
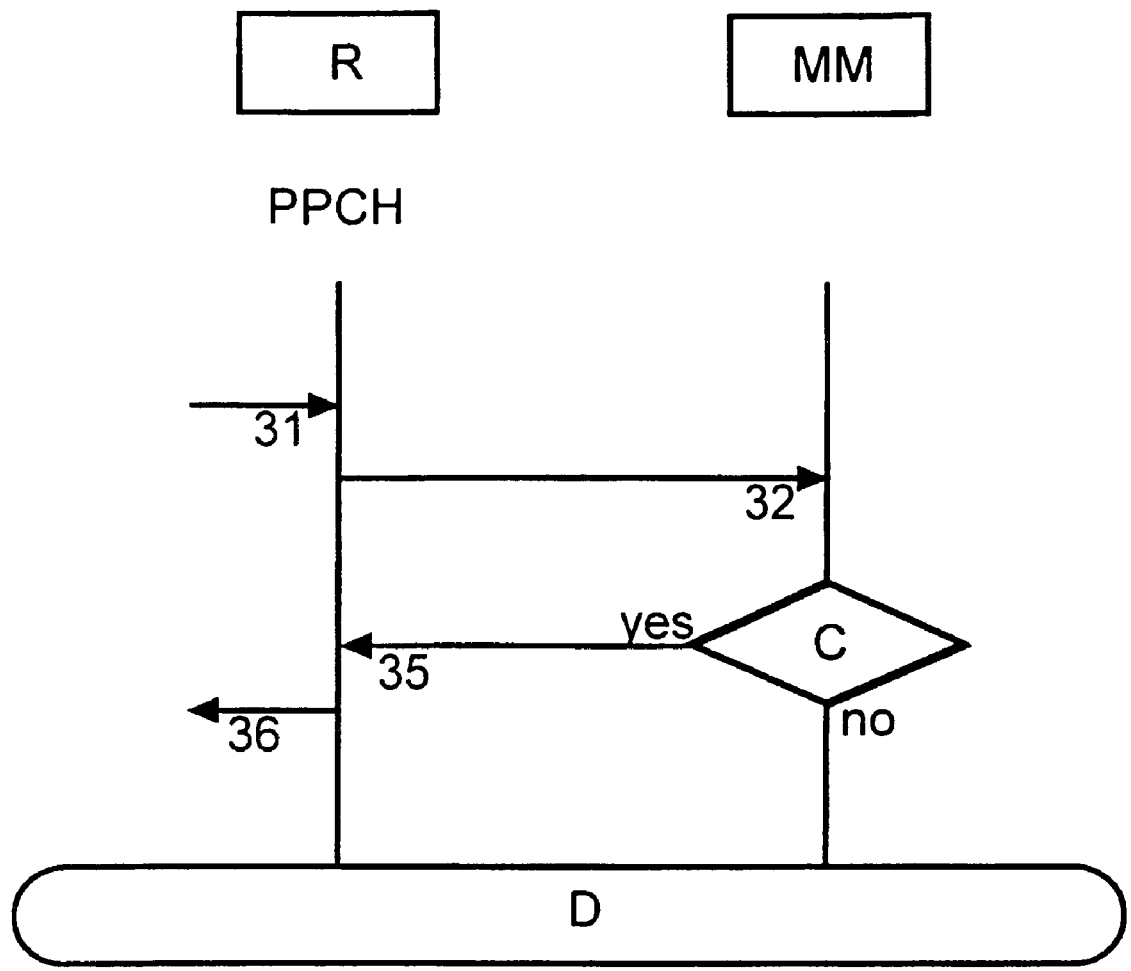
FIG. 4 shows a signaling sequence of an embodiment of the invention applied in the case of a handover request.

Referring now to FIGS. 2 to 4, signaling sequences according to an embodiment of the invention are shown. The signaling involves a base station of a radio access network R for a mobile communication network conforming to the Packet Personal Digital Cellular standard, and a mobility management instance MM that, in the present example, is run on a packet mobile services switching node PMSC of the Packet Personal Digital Cellular network.

The radio access network R for the mobile communication network provides a multipoint-to-point radio channel in order to enable a plurality of mobile stations to access the network over the air at a base station of a network cell that the respective mobile station currently visits. The cellular network provides a packet communication physical channel (PPCH) between the mobile station and the base station. This physical channel is a particular Radio Frequency Time Slot (RFTS) of a Time Division Multiple Access (TDMA) frame on a carrier frequency. Furthermore, the network provides a user packet channel UPCH as a logical channel between the mobile station and the packet mobile services switching center. The user packet channel UPCH is defined as a particular Radio Frequency Time Slot (RFTS) of the packet communication physical channel (PPCH) and serves to transmit packet data from the mobile station to the packet mobile services switching center.

The mobility management instance MM comprises functions to handle registration, authentication, network location, channel reselection, and deregistration of the mobile station. In addition, the mobility management instance MM comprises a counter that counts the number of current users of the user packet channel UPCH. In the case, where the mobility management instance MM concerns more than one user packet channel UPCH, for example, if the packet mobile services switching center PMSC controls a terminal registration area that includes a plurality of cells wherein each cell is provided with at least one user packet channel UPCH, the mobility management instance MM is provided with a counter for each user packet channel UPCH such that there is one counter instance per user packet channel.

The mobility management instance MM provides extended processing to requests received from the mobile station. The mobility management instance MM checks requests related to new call arrivals and handover against a current value of the counter belonging to the user packet channel UPCH used for the request, i.e., the mobility management instance MM checks the current number of users of the user packet channel that the mobile station is attached to or requests attachment to. Thus, the mobility management instance MM directly determines the present load of the channel.

In FIG. 2, the base station of the radio access portion R of the Packet Personal Digital Cellular network receives a first communication registration request signal 11 of the mobile station (not shown in FIG. 2). The base station forwards the communication registration request using a first forwarding signal 12 to the packet mobile services switching center (not shown in FIG. 2) for handling by the mobility management instance MM. The mobility management instance processes the incoming request. At (A), the processing includes a check of available system resources such as processing time and memory required for further handling of the request as described in detail below. If no dynamic overload is detected, i.e., if there are sufficient system resources, the request is forwarded using a second forwarding signal 13 to a static overload check instance LA that, at (B), checks whether any single system resource is loaded to its static limit.

If no static overload is detected, i.e., if all system resources are available, the static overload check instance LA provides an availability signal 14 to the management mobility instance MM. At (C), the management mobility instance MM performs further steps of the inventive method: the management mobility instance MM determines that the communication registration request of the mobile station is of a first communication request type that indicates a new call arrival, i.e., an initial request for communication service. The management mobility instance MM counts the number of mobile stations presently attached to the user packet channel and thereby determines the current channel load. The management mobility instance MM decides whether to reject or to accept the initial request for communication service. The initial request for communication service is rejected if the determined channel load exceeds a first channel load limit that applies to initial requests for communication service, and, if, yes, a channel overload is detected a request reject signal 15 is sent to the base station that sends a channel unavailable signal 16 to the mobile station. However, if, no, the determined channel load does not exceed the first channel load limit, the initial request for communication service is accepted and, at (D), processing proceeds with an authentication procedure.

In FIG. 3, the base station of the radio access portion R of the Packet Personal Digital Cellular network receives a second communication registration request signal 21 of the mobile station (not shown in FIG. 3). The base station forwards the communication registration request using a forwarding signal 22 to the packet mobile services switching center (not shown in FIG. 3) for handling by the mobility management instance MM. The mobility management instance processes the incoming request. At (A), the processing includes a check of available system resources such as processing time and memory required for further handling of the request as described in detail below. If no dynamic overload is detected, i.e., if there are sufficient system resources, at (C), the management mobility instance MM performs further steps of the inventive method: the management mobility instance MM determines that the communication registration request of the mobile station is of a second communication request type that indicates that the mobile station has already successfully provided an initial communication request and therefore is already attached to the user packet channel. Now the mobile station requests communication service further to the successful initial request for communication service. The management mobility instance MM counts the number of mobile stations presently attached to the user packet channel and thereby determines the current channel load. The management mobility instance MM decides whether to reject or to accept the request for further communication service. The request for further communication service is rejected if the determined channel load exceeds a second channel load limit that applies to requests for further communication service, and, if, yes, a channel overload is detected, a request reject signal 25 is sent to the base station that sends a channel unavailable signal 26 to the mobile station. However, if, no, the determined channel load does not exceed the second channel load limit, the request for further communication service is accepted and, at (D), processing proceeds with an authentication procedure.

Referring now to FIG. 4, the base station of the radio access portion R of the Packet Personal Digital Cellular network receives a third request signal 31 of the mobile station (not shown in FIG. 4) that comprises a request for channel registration. The base station forwards the request for channel registration using a forwarding signal 32 to the packet mobile services switching center (not shown in FIG. 4) for handling by the mobility management instance MM. At (C), the management mobility instance MM receives the request and processes the request by performing extended processing including steps of the inventive method: the management mobility instance MM determines that the request of the mobile station is a handover request for channel registration during channel reselection, for example, in order to continue an active packet data session while having moved out of a neighboring cell into the currently visited cell. The management mobility instance MM counts the number of mobile stations presently attached to the user packet channel of the cell currently visited by the mobile station and thereby determines the current channel load. The management mobility instance MM decides whether to reject or to accept the handover request for channel registration. The request is rejected if the determined channel load exceeds a third channel load limit that applies to handover requests, and a request reject signal 35 is sent to the base station that sends a channel unavailable signal 36 to the mobile station. However, if, no, the determined channel load does not exceed the third channel load limit, the handover request for channel registration is accepted and, at (D), processing proceeds.

The values of the limits, i.e. the value of the first limit applying to first type communication requests, the value of the second limit applying to second type communication requests, and the value of the third limit applying to handover requests are different from each other. The third limit applying to handover requests is particularly high such that handover requests are prioritized over first and second type communication requests, and the latter are prioritized over first type communication requests. Thus a multistage limit is provided and applied to various request types such that the channel is protected efficiently against overload and thus is kept usable with a high quality of service for registered users running a successfully established packet data session.

Figures 5, 6:
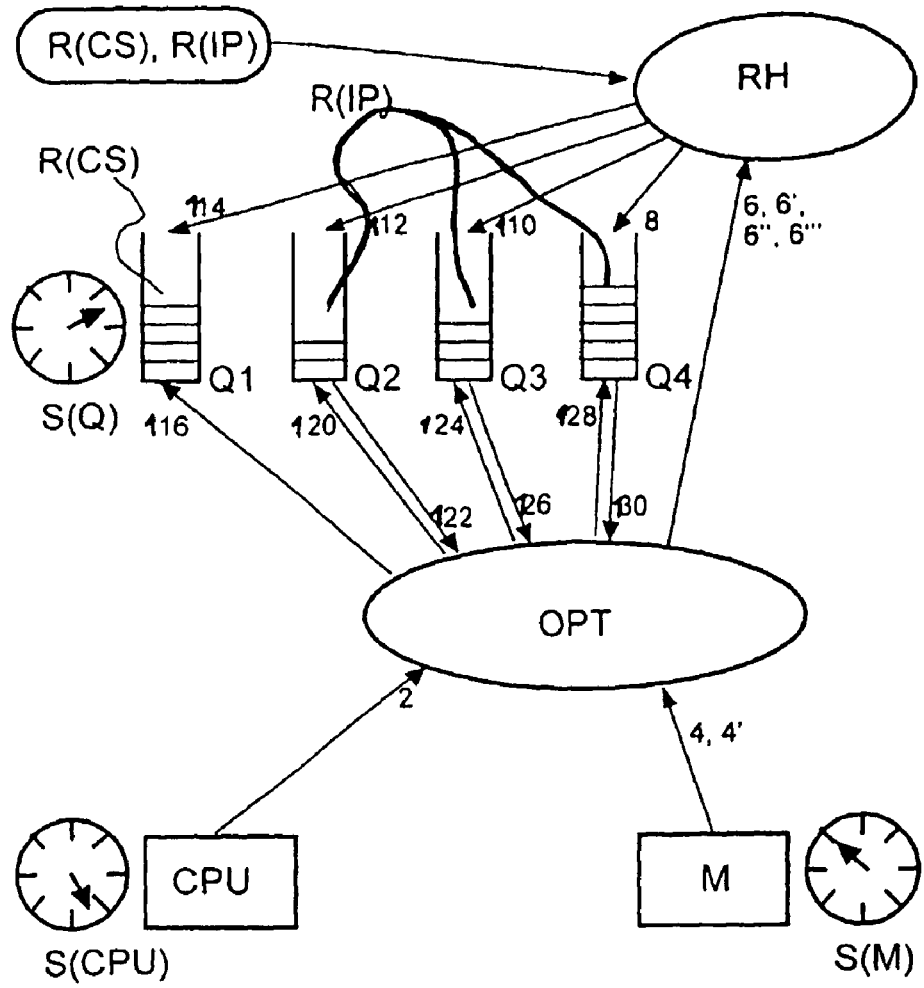
FIG. 5 is a schematic diagram illustrating one embodiment of the invention in which an overload protection task monitors a load status of several resources of a packet switching network node.
FIG. 6 is a table comprising rules for detecting node resource overload and measures determined in response to each detected rule.

FIG. 5 schematically shows resources of a packet switching network node that are protected from overload due to processing requests sent by the mobile station through the user packet channel to the network. The packet switching network node (not shown) comprises at least the following resources: a central processing unit CPU, a memory unit M and four input queues Q1, . . . , Q4 which collect incoming requests R. The node further comprises a request handler RH that deals with incoming requests R and distributes these requests R to the input queues Q1, . . . , Q4 as indicated in FIG. 5 by arrows 114, 112, 110 and 8, respectively. Different queues are for different incoming processing requests R. Queue Q1 receives control signaling requests R(CS) such as registration and deregistration requests. Queues Q2, Q3 and Q4 receive user data requests R(IP). The user data requests are provided as internet protocol packets IP.

Supervision tasks S(Q), S(CPU) and S(M) monitor the load status of the node resources, i.e., input queues Q1, . . . , Q4, control processing unit CPU, and memory unit M, respectively.

A central overload protection task OPT is run cyclically on the central processing unit CPU. The central overload protection task OPT comprises the supervision task S(Q) to monitor the fill levels of the input queues Q1, Q2, Q3 and Q4. This monitoring is indicated in FIG. 5 by arrows 116, 120, 124 and 128, respectively. Furthermore, the supervision tasks S(CPU) and S(M) are run cyclically in the central processing unit CPU in order to monitor the load of the central processing unit CPU and the memory unit M and to detect an overload situation. Detection of is the overload situation is accomplished in accordance with a set of predetermined rules RA, . . . , RE. The rules are defined as follows:

| Reference | Rule |
| --- | --- |
| RA | Memory M is short, i.e., consumption of memory M exceeds a predetermined first threshold |

-continued

| Reference | Rule |
|---|---|
| RB | Memory M is very short, i.e., consumption of memory M exceeds a predetermined second threshold superior to the first threshold |
| RC | The processor CPU load exceeds the predetermined processor load limit for several ticks |
| RD | The fill level of control signaling requests R(CS) such as registration/deregistration requests in the input queue Q1 exceeds a predetermined control signaling request fill level of N1 requests |
| RE | The fill level of user data requests provided as user data packets in the input queues Q2, Q3, Q4 exceeds a predetermined user data request fill level of N2 = N3 = N4 requests |

If any of the supervision tasks S(Q), S(CPU), S(M) detects an overload situation in one of the node resources Q1, . . . , Q4, CPU, M, the detecting supervision task S(Q), S(CPU), and/or S(M) triggers the overload protection. The overload protection task possesses a set of measures MA, . . . , MD to react against overload. Overload protection is achieved by determining measures MA, MB, MC and/or MD for dissolving the overload situation and by enforcing the determined measure. The measures MA, MB, MC, MD are defined as follows:

| Reference | Measure |
|---|---|
| MA | Reject a predetermined ratio of 20% of control signaling requests R(CS) received for input queue Q1 |
| MB | Reject all control signaling requests R(CS) received for input queue Q1 |
| MC | Drop user data requests R(IP), i.e., internet protocol packets received in input queues Q2, Q3, Q4 |
| MD | Flush all user data requests R(IP), i.e., internet protocol packets from input queues Q2, Q3, Q4 |

Preferably, measures MA, MB, and MC are executed by the request handler RH, while measure MD is executed by the overload protection task itself.

FIG. 6 shows references to rules RA, . . . , RE for detecting an overload situation and measures MA, . . . , MD determined in correspondence to the rule that gave rise to the detection of the overload situation. The overload protection task selects a certain measure MA, MC (or a combination of two measures MA and MC, MB and MD) depending on the rule RA, . . . , RE that was violated.

In case the supervision task S(M) monitoring memory M detects memory shortage according to rule RA, i.e., memory consumption to exceed the first predetermined limit, a corresponding information 4 is provided to the overload protection task OPT. The overload protection task OPT reacts to this information 4 by sending a trigger 6 to the request handler RH to take measures MA and MC, i.e., to reject a predetermined ratio of control signaling requests R(CS) received in the input queue Q1 (in the present example the ratio is 20%, however, any ratio from 0 to 1 can be predetermined), and to drop new user data requests R(IP), i.e. internet protocol packets from the input queues Q2, Q3, Q4. Request handler RH dissolves the overload situation by executing the determined measures MA and MC.

If the supervision task S(M) monitoring memory M detects memory shortage according to rule RB, i.e., the memory consumption exceeding the second predetermined limit, the corresponding information 4' is provided to the overload protection task OPT. The overload protection task OPT reacts to this information 4' by sending a corresponding trigger 6' to the request handler RH to take measure MB. i.e., to reject all control signaling requests R(CS) received in the input queue Q1. The request handler RH dissolves the overload protection by executing the determined measure MB. Moreover, the overload protection task flushes input queues Q2, Q3, Q4 from all user data requests R(IP), i.e. from all internet protocol packets, as indicated in FIG. 5 by arrows 122, 126, 130. Thus, the overload protection task itself dissolves the overload situation by executing the determined measure MD.

In case the supervision task S(CPU) monitoring the central processing unit CPU detects that the CPU load exceeds the predetermined processor load limit for several ticks according to rule RC, a corresponding information 2 is provided to the overload protection task OPT. The overload protection task OPT reacts to this information 4 by sending a trigger 6 to the request handler RH to take measures MA and MC, i.e., to reject a predetermined ratio of control signaling requests R(CS) received in the input queue Q1 (in the present example the ratio is 20%, however, any ratio between 0 and 1 can be predetermined), and to drop new user data requests R(IP), i.e. internet protocol packets from the input queues Q2, Q3, Q4. Request handler RH dissolves the overload situation by executing the determined measures MA and MC.

If the supervision task S(Q), comprised in the overload protection task and monitoring the input queues Q1, . . . , Q4, detects that the fill level of control signaling requests R(CS) such as registration/deregistration requests in the input queue Q1 exceeds the predetermined control signaling request fill level of N1 requests according to rule RD, the overload protection task OPT reacts to this information by sending a trigger 6" to the request handler RH to take measure MA, i.e., to reject a predetermined ratio of control signaling requests R(CS) received in the input queue Q1 (in the present example the ratio is 20%, however, any ratio from 0 to 1 can be predetermined). The request handler RH dissolves the overload situation by executing the determined measure MA.

If the supervision task S(Q), comprised in the overload protection task and monitoring the input queues Q1, . . . , Q4, detects that the fill level of user data requests R(IP), i.e., internet packet data in any of input queues Q2, Q3, and/or Q3 to exceed the predetermined control signaling request fill level of N2=N3=N4 requests according to rule RE, the overload protection task OPT reacts to this information by sending a trigger 6''' to the request handler RH to take measure MC, i.e., to drop new user data requests R(IP), i.e. internet protocol packets from the input queues Q2, Q3, Q4. The request handler RH dissolves the overload situation by executing the determined measure MC.

The invention claimed is:

1. Method for protecting against overload of a multipoint-to-point channel of a mobile communication network, said multipoint-to-point channel being provided by a radio access network for the mobile communication network in order to enable a plurality of mobile communication means to access the mobile communication network, wherein each mobile communication means can attach to the multipoint-to-point channel to provide processing requests to the mobile communication network, in particular to a packet switching node of the mobile communication network, comprising the steps of:

receiving a processing request wherein said processing request is associated with one of at least two different request types;

detecting the request type of the received request;

counting the number of mobile communication means presently attached to the multipoint-to-point channel;

determining, based on the counted number of attached mobile communication means, a present load on the multipoint-to-point channel;

determining a utilization level of a processor, in said packet switching node, used for request processing; and deciding whether to reject or to accept the request for processing, wherein the decision is based on the detected request type and on the determined present load of the multipoint-to-point channel.

2. Method according to claim 1, comprising the step of:

according to the decision regarding rejection or acceptance of the request for processing, either rejecting or accepting the request for processing.

3. Method according to claim 2, wherein the request for processing is rejected if the detected request type is equal to a predetermined request type and the determined channel load exceeds a predetermined channel load limit that applies to the predetermined request type.

4. Method according to claim 3, wherein at least two different channel load limits are provided that apply to at least two different predetermined request types.

5. Method according to claim 4, wherein the first channel load limit applies to a first communication request type that is used for initial requests for communication service.

6. Method according to claim 4, wherein the second channel load limit applies to a second communication request type used for requests for communication service further to successful initial requests for communication service.

7. Method according to claim 4, wherein a third channel load limit corresponds to a handover request type.

8. Method according to claim 1, wherein said mobile communication network comprises a packet switching node, said packet switching node being provided with resources for processing of processing requests and with an overload protection task for protection of said resources from overload, said resources comprising at least one input queue for processing requests, the first input queue being dedicated to receiving control signaling request, the processor for request processing and a memory for storing data related to request processing, said resources for processing being limited, wherein said network node, in particular said overload protection task, performs the steps of:

monitoring a load status of said node resources, detecting, by means of the load status, any overload situation arising at the monitored node resources, and determining, in the case of a detected node resource overload situation, dependent on predetermined rules, an overload dissolving measure;

wherein said step of detecting a node resource overload situation comprises:

detecting whether the fill level of control signaling requests in the first input queue exceeds a predetermined control signaling request fill level.

9. Method according to claim 8, wherein said resources comprise at least a second input queue for requests to be processed, the second input queue being dedicated to receiving user data requests, said user data requests being provided as user data packets, and wherein the step of detecting a node resource overload situation comprises:

detecting whether memory consumption exceeds a predetermined first threshold, detecting whether memory consumption exceeds a predetermined second threshold, the second threshold being superior to the first threshold, detecting whether the processor load exceeds a predetermined processor load limit, and detecting whether the fill level of user data requests in the second input queue exceeds a predetermined user data request fill level.

10. Method according to claim 9, wherein said determined node resource overload dissolving measure comprises the steps of:

if the memory consumption exceeds the predetermined first threshold, or if the processor load exceeds the predetermined processor load limit:

rejecting a predetermined ratio of control signaling requests received in said first input queue, and dropping said user data packets from said second input queue, if the memory consumption exceeds the predetermined second threshold:

rejecting all control signaling requests received in said first input queue, and dropping all user data packets from said second input queue, if the fill level of control signaling requests in the first input queue exceeds the predetermined control signaling request fill level:

rejecting a predetermined ratio of control signaling requests received in said first input queue, if the fill level of user data requests in the second input queue exceeds the predetermined user data request fill level:

dropping said user data packets from said second input queue.

11. Method according to claim 8, comprising the step:

dissolving the detected node resource overload situation by executing the determined at least one node resource overload dissolving measure.

12. Method according to claim 11, wherein said overload dissolving measure is suspended if said determined overload situation is dissolved.

13. A system for protecting against overload of a multipoint-to-point channel of a mobile communication network, said multipoint-to-point channel being provided by a radio access network for the mobile communication network in order to enable a plurality of mobile communication means to access the mobile communication network, wherein each mobile communication means can attach to the multipoint-to-point channel to provide processing requests to the mobile communication network, in particular to a packet switching node of the mobile communication network, comprising:

means for receiving a processing request wherein said processing request is associated with one of at least two different request types;

means for detecting the request type of the received request;

means for counting the number of mobile communication means presently attached to the multipoint-to-point channel;

means for determining, based on the counted number of attached mobile communication means, a present load on the multipoint-to-point channel and a level of processor utilization on a processor, in said packet switching node, used for request processing;

means for deciding whether to reject or to accept the request for processing, wherein the decision is based on the detected request type and on the determined present load of the multipoint-to-point channel.

14. The system according to claim 13, comprising:
according to the decision regarding rejection or acceptance of the request for processing, means for rejecting or accepting the request for processing.

15. The system according to claim 14, wherein the request for processing is rejected if the detected request type is equal to a predetermined request type and the determined channel load exceeds a predetermined channel load limit that applies to the predetermined request type.

16. The system according to claim 15, wherein at least two different channel load limits are provided that apply to at least two different predetermined request types.

17. The system according to claim 16, wherein the first channel load limit applies to a first communication request type that is used for initial requests for communication service.

18. The system according to claim 16, wherein the second channel load limit applies to a second communication request type used for requests for communication service further to successful initial requests for communication service.

19. The system according to claim 16, wherein a third channel load limit corresponds to a handover request type.

20. The system according to claim 13, wherein said mobile communication network further comprises a packet switching node, said packet switching node being provided with a memory device for storing data related to said processing requests, wherein said means for determining present load on the multipoint-to-point channel comprises means for determining the memory consumption level on said memory device.

21. The system according to claim 13, wherein said mobile communication network further comprises a memory queue for storing said processing requests, wherein said means for determining present load on the multipoint-to-point channel comprises means for determining the fill level on said memory queue.

* * * * *